(12) United States Patent
Garofalo et al.

(10) Patent No.: US 8,891,372 B2
(45) Date of Patent: Nov. 18, 2014

(54) APPLICATION DATA FLOW MANAGEMENT IN AN IP NETWORK

(75) Inventors: Angelo Garofalo, Turin (IT); Eugenio Maria Maffione, Turin (IT)

(73) Assignee: Telecom Italia S.p.A., Milan (IT)

( * ) Notice: Subject to any disclaimer, the term of this patent is extended or adjusted under 35 U.S.C. 154(b) by 524 days.

(21) Appl. No.: 12/452,444

(22) PCT Filed: Jul. 2, 2007

(86) PCT No.: PCT/IT2007/000473
§ 371 (c)(1),
(2), (4) Date: Dec. 30, 2009

(87) PCT Pub. No.: WO2009/004655
PCT Pub. Date: Jan. 8, 2009

(65) Prior Publication Data
US 2010/0142524 A1   Jun. 10, 2010

(51) Int. Cl.
| | |
|---|---|
| H04L 12/833 | (2013.01) |
| H04L 12/865 | (2013.01) |
| H04L 12/869 | (2013.01) |
| H04L 12/877 | (2013.01) |
| H04L 12/801 | (2013.01) |
| H04L 12/891 | (2013.01) |
| H04L 12/851 | (2013.01) |
| H04L 12/863 | (2013.01) |
| H04L 12/815 | (2013.01) |
| H04L 12/853 | (2013.01) |
| H04L 12/54 | (2013.01) |
| H04L 12/859 | (2013.01) |

(52) U.S. Cl.
CPC ............. *H04L 47/10* (2013.01); *H04L 47/41* (2013.01); *H04L 47/2408* (2013.01); *H04L 47/6265* (2013.01); *H04L 47/22* (2013.01); *H04L 47/621* (2013.01); *H04L 47/2416* (2013.01); *H04L 12/5693* (2013.01); *H04L 47/2475* (2013.01); *Y02B 60/33* (2013.01); *H04L 47/2441* (2013.01)
USPC ........... 370/235; 370/229; 709/232; 709/234; 709/235

(58) Field of Classification Search
CPC ...................................................... H04L 47/71
USPC ................... 370/229, 235; 709/232, 234, 235
See application file for complete search history.

(56) References Cited

U.S. PATENT DOCUMENTS 6,724,721 B1    4/2004   Cheriton
6,981,052 B1 *  12/2005  Cheriton ....................... 709/232
(Continued)

FOREIGN PATENT DOCUMENTS

CN          1855824          11/2006
WO    WO 2006/069044 A3     6/2006

OTHER PUBLICATIONS

European Patent Office Action dated Aug. 24, 2011, for counterpart European Patent Application No. 07 805 685.0.

(Continued)

*Primary Examiner* — Ayaz Sheikh
*Assistant Examiner* — Tarell Hampton
(74) *Attorney, Agent, or Firm* — Finnegan, Henderson, Farabow, Garrett & Dunner, L.L.P.

(57) ABSTRACT

A method for serving an aggregate flow in a communication network node includes a plurality of individual flows. The method includes identifying in the aggregate flow, based on serving resources allocated to the network node, individual flows that may be served without substantial detriment to perceived performance, and serving the identified individual flows with priority with respect to the remaining individual flows in the aggregate flow. The method allows the presence of individual flows that may not be served without substantial detriment to perceived performance due to shortage of serving resources to be notified to an external control entity.

15 Claims, 3 Drawing Sheets

(56) References Cited

U.S. PATENT DOCUMENTS

| | | | |
|---|---|---|---|
| 7,096,260 B1* | 8/2006 | Zavalkovsky et al. | 709/223 |
| 7,545,814 B2* | 6/2009 | Hiironniemi | 370/395.41 |
| 7,646,717 B1* | 1/2010 | Anker et al. | 370/235 |
| 2001/0007560 A1* | 7/2001 | Masuda et al. | 370/401 |
| 2003/0120795 A1 | 6/2003 | Reinshmidt | |
| 2003/0189943 A1 | 10/2003 | Gorti et al. | |
| 2004/0085864 A1* | 5/2004 | Terao et al. | 369/30.05 |
| 2004/0260829 A1* | 12/2004 | Husak et al. | 709/232 |
| 2005/0047415 A1* | 3/2005 | Channegowda et al. | 370/395.4 |
| 2005/0059417 A1 | 3/2005 | Zhang et al. | |
| 2005/0281278 A1* | 12/2005 | Black et al. | 370/412 |
| 2006/0187949 A1* | 8/2006 | Seshan et al. | 370/412 |
| 2006/0248214 A1 | 11/2006 | Jackson et al. | |
| 2007/0053292 A1* | 3/2007 | DePaul et al. | 370/235 |
| 2007/0081456 A1 | 4/2007 | Gorti et al. | |
| 2007/0115825 A1* | 5/2007 | Roberts | 370/235 |
| 2007/0201365 A1* | 8/2007 | Skoog et al. | 370/230.1 |
| 2007/0237074 A1* | 10/2007 | Curry | 370/229 |

OTHER PUBLICATIONS

Chinese Office Action dated Mar. 6, 2012, for corresponding Chinese Patent Application No. 200780100438.5.

Kortebi, A., et al. "MBAC Algorithm for Streaming Flows in Cross-Protect," France Telecom R&D, May 24, 2004, 10 pgs.

Nichols, K., et al., "Definition of the Differentiated Services Field (DS Field) in the IPv4 and IPv6 Headers," Network Working Group, Dec. 1998, 20 pgs.

Blake, S., et al., "An Architecture for Differentiated Services," Network Working Group, Dec. 1998, 36 pgs.

Grossman, D., "New Terminology and Clarifications for Diffserv," Network Working Group, Apr. 2002, 10 pgs.

Roberts, J.W., "Internet Traffic, QoS and Pricing," France Telecom R&D, 2003, 10 pgs.

Office Action issued by Chinese Patent Office in related Chinese Application No. 200780100438.5, dated Apr. 21, 2014, 6 pages.

Communication Pursuant to Article 94(3) EPC in related European Application No. 07 805 685.0-1505, dated Mar. 4, 2014, 5 pages.

* cited by examiner

APPLICATION DATA FLOW MANAGEMENT IN AN IP NETWORK

CROSS REFERENCE TO RELATED APPLICATION

This application is a national phase application based on PCT/IT2007/000473, filed Jul. 2, 2007.

TECHNICAL FIELD OF THE INVENTION

The present invention relates in general to application data flow management in an IP network, and in particular to a method, a system and a software product for serving an aggregate application data flow traversing a communication network node.

BACKGROUND ART

In recent years, services available on the Internet and/or within corporate intranets and based on delivery of media contents, especially of the multimedia type, have achieved a particular significance. This is supported by both the availability of wider transmission bandwidths for the access to these services, and the steady increase in the number and types of the contents available for delivery.

In addition to traditional web contents, other multimedia contents, such as on-demand and live video streaming, now provide services that are particularly important for the users, such as E-learning, Internet Broadcasting, Video On Demand, etc. This scenario becomes continuously richer and richer due to new types of contents that are typically supported by vertical platforms provided by specific and specialised providers, for example platforms for gaming-on-demand and application-on-demand.

In this scenario, the problem of managing quality on these networks has assumed great significance from the viewpoint of guaranteeing the user, i.e. the consumer of the multimedia contents, with an adequate Quality of Experience for the service.

To allow operators to differentiate the transport over these networks of traffic originated by different types of service, various solutions have been studied.

Amongst the solutions proposed by the scientific community, and in particular by the Internet Engineering Task Force (IETF), a solution referred to as Differentiated Services (Diff-Serv) is disclosed for example in documents RFC3260, RFC2475 and RFC2474. This solution provides for flows in input to an area/domain to be analyzed and grouped in a traffic aggregate, known as service class, that is then handled on the network according to certain policies known as Per Hop Behaviours (PHB). It can be noted that in document RFC2638 it is pointed out that this solution requires the presence of specific elements, called Bandwidth Brokers (BB) able to interpret user requests and evaluate their admissibility according to preconfigured policies and the availability of network resources (Admission Control operation).

The Admission Control operation performed by the Bandwidth Brokers, deals with checking the availability of network resources before establishing a given flow between two physical points of the network, in order to prevent congestion conditions from being created on the path used when a specific service class is utilized, which would cause packet loss and hence service degradation.

With regard to network congestion control, mechanisms have been studied that, in case of insufficient resources, ensure that a certain "fairness" is guaranteed in handling the traffic passing through the congestion point. These mechanisms are essentially based on the implementation of classification, queuing and scheduling algorithms inside the network devices.

In particular, each incoming packet is opportunely classified and inserted in a queue forming part of a set of available queues. Queues are read out by a scheduler according to a statistically fair policy, such as round-robin. In round-robin scheduling, one packet is read out from each queue, one queue at time, reading again from the first queue only when one packet has been read out from every other queue. This mechanism, known as Fair Queuing (FQ), can be modified/improved in various manners.

For example, U.S. Pat. No. 6,981,052 discloses a method for extending class-based queuing (CBQ) with multiple "behavioural" queues per class which includes a dynamic weighting mechanism between these queues. The packets are forwarded from the behavioural queues according to the weighting assigned to each queue. The weighting for packet scheduling of the queues is adjusted to account for additional flow going through the queues. The weight of a queue is controlled relative to the weight available to other queues. When a flow is reclassified, the queue weight is readjusted accordingly. Well behaved flows experience low delay and can thus achieve a fair bandwidth allocation without having multiple packets queued to compete with non-adaptive aggressive flows.

Further, U.S. Pat. No. 6,724,721 discloses a method for limiting the throughput rate of non-adaptive aggressive flows on a packet-by-packet basis. Each packet of an input flow is mapped to an entry in a flow table for each output queue. The mapping is based on a subset of the packet's header data, giving an approximation of per-flow management. Each entry contains a credit value. On packet reception, the credit value is compared to zero; if there are no credits, the packet is dropped. Otherwise, the size of the packet is compared to the credit value. If sufficient credits exist (i.e., size is less than or equal to credits), the credit value is decremented by the size of the packet in cells and the processing proceeds according to conventional methods.

If, however, the size of the packet exceeds the available credits, the credit value is set to zero and the packet is dropped. A periodic task adds credits to each flow table entry up to a predetermined maximum. The processing rate of each approximated flow is thus maintained to the rate determined by the number of credits present at each enqueuing decision, up to the allowed maximum. The scheme operates independently of packet flow type, providing packet-specific means for rapidly discriminating well-behaved flows that adapt to congestion situations signalled by packet drop from aggressive, non-adaptive flows and managing throughput bandwidth accordingly. Bandwidth is shared fairly among well-behaved flows, large and small, and time-critical (low latency) flows, thereby protecting all from non-adapting aggressive flows.

With reference to the QoS requirements the document "*Internet Traffic, QoS and Pricing*", J. W. Roberts, France Telecom R&D, 2003, discloses to subdivide application flow typologies into elastic and anelastic flows. In particular, the author suggests to "distinguish" two kinds of flow termed streaming and elastic. Streaming flows transmit an audio or video signal for real-time play-out. Correct reconstitution of the signal requires low packet loss and delay. The quality of a streaming application also clearly depends on the signal bit rate. Flows generally have variable bit rate due to the use of compression coding. Elastic flows transfer digital documents corresponding to an e-mail, a Web page or an MP3 track, for instance. The rate of elastic flows can be varied without significant detriment to perceived performance which depends on the overall transfer time. The quality of service requirement here relates to the response time or, equivalently, to the average throughput over the entire transfer.

In addition, the author considers as flows on which the QoS is to be controlled not the "generic" flows that transit from one network equipment's physical port to another, but the ones "related to the service applications" (micro flows), which can be characterized by attributes that, although dynamically assigned, are "stable" during the course of a single feed, such as the address of the source that originates the application (e.g. a Video on Demand Server), the address of the user that received the application (e.g. a single terminal or group of terminals) and the protocol parameters utilized for the transfer of the application (e.g. protocol type and ports).

The application of QoS policies on these micro flows allows the Admission Control architecture to be simplified, transferring its functionality directly to the network devices via the "Measurement Based Admission Control" concept, which places the logic for the Admission Control precisely inside one or more devices through which the micro flow passes. From this, in "*MBAC algorithm for streaming flows in Cross Protect*", A. Kortebi, S. Oueslati and J. Roberts, France Telecom R&D, 2004, an algorithm is proposed that is directly implementable on a device and capable of managing both elastic and anelastic flows.

This algorithm contemplates periodic measurement of bandwidth utilization and takes the decision on the admissibility of a flow based on a percentage of the estimated load in the last measurement interval. In particular, this algorithm blocks new flows in the next interval whenever the current load estimate exceed 0.88, this percentage being calculated as a function of the probability of overflow (congestion) that it is wished to have.

WO2006/069044 discloses a mechanism for identifying and penalizing misbehaving flows in a network, wherein policies are implemented on a single flow according to the statistical attributes detected on the flow itself. In particular, a flow ID and a set of behavioural statistics are maintained for each flow, and these behavioural statistics are updated as information packets belonging to the processed flow. These behavioural statistics include a total byte count, a life duration, a flow rate, a number of packet processed; an average packet size, a badness factor, and a timestamp. Based upon these behavioural statistics, a determination is made as to whether a flow is exhibiting undesirable behaviour. If so, a penalty is imposed on the flow. This penalty causes packets belonging to the flow to have a higher probability of being dropped than packets belonging to other flows that do not exhibit undesirable behaviour. In addition to penalizing the flow, this penalty also has the effect of correcting the flow's behaviour such that the flow exhibits less undesirable behaviour after the penalty than before. By correcting the flow's behaviour, the penalty makes it possible for the flow to become a non-misbehaving flow.

OBJECT AND SUMMARY OF THE INVENTION

The Applicant has observed that these statistical mechanisms are not easily implementable on existing devices, for example on Local Area Network (LAN) cards, where, for reasons of cost and economies of scale, specialized processors (network processor) are adopted on which it is difficult to add additional computation logic, such as that specific for flow-by-flow accounting and statistics.

In addition, the Applicant has noted that unlike the proposal of J. Roberts, the mechanism disclosed in WO2006/069044 does not contemplate a complete dropping of the flow, but that it can be served more or less well (penalty concept), possibly in a progressive manner as badness varies and therefore according to an approach more similar to that proposed in U.S. Pat. No. 6,981,052. In fact, both U.S. Pat. No. 6,981,052 and WO2006/069044 point out how the application of a drop or a penalty to a flow can have a retroaction on the flow's classification, making it progressively "move up the chart", so approaching the well-behaving group, i.e. those served best.

However, the Applicant has noted that inelastic flows regarding multimedia contents are much more sensitive to dropped packets and cannot therefore be treated in fair or progressive ways, but rather should be handled in a way that is as close as possible to an on/off mode, without prejudice to maximum efficiency in the utilization of available resources. In fact, serving several inelastic flows for which the available resources are insufficient in a "fair" way, such as implementing a traffic management of the Weighted Fair Queuing type results in a generalized packet loss across the various flows. This condition, although tolerable for flows that do not have specific QoS requirements (elastic flows), has serious repercussions in the case of inelastic flows, the information content of which becomes irremediably compromised by a lack of sufficient resources, causing generalized degradation of the provided service.

The objective of the present invention is therefore to provide a mechanism that in case of insufficient network resources in term of available transmission bandwidth, avoids degradation of the inelastic flows destined to share said transmission bandwidth.

This objective is achieved by the present invention in that it relates to a method, a system and a software product for managing application data flows in a node of a communication network, as defined in the appended claims.

The present invention achieves the aforementioned objective by assigning the available flow serving resources (transmission or forwarding bandwidth) allocated to the network node between the various individual flows according to a service logic that rewards a flow to the detriment of the others. In particular, the service logic is based on the definition of a dynamic set of flows that can be well served on the basis of the available resources. The assignment of resources is therefore made with regard to the flows belonging to that set, excluding the remaining flows (bad-served flows) upon which poor service deriving from insufficiency of resources becomes concentrated. For example, a possible resource sharing logic could recompenses the "ages" of the flows, so as to penalize the younger flows (most recently established) and safeguard the older ones (longer established) in the case of insufficiency of available resources.

The present invention thus takes the form of an Admission Control mechanism that can be defined as implicit, because it can be carried out autonomously by a network node, without the need for dialogue with a control entity, as is instead required by the classical techniques of explicit admission control such as those, indicated in prior-art (bandwidth brokers).

Advantageously, the Implicit Admission Control mechanism according to the present invention has less internal complexity, in order to operate it doesn't require any pre-provisioned information about the managed flows and it provides the served flows with a good protection with regards to the acquired quality. A discrimination of well-served flows from bad-served flows (as difference from the total flows received)

allows the network element that implements the mechanism according to the present invention to notify an external control entity of network flows that, in passing through it, undergo more or less significant degradation (deriving, for example, from dropped data packets or excessive latencies). This feature is of extreme interest for an objective assessment of the QoS level provided to the user when consuming the service and makes advanced control mechanisms possible, aimed at the improvement of the user's customer experience when using the services offered by the Operator. This feature may for example be used to automatically refund what has been paid by a user if the network is unable to transport his flow with adequate QoS levels, to implement more advanced flow promotion policies than simply that of age, which allow the flows of a user to be facilitated at the expense of those of another, or even in self-defending network systems that block flows for which bad service is being encountered directly at the network borders, thus preventing these from pointlessly using resources that could be used otherwise.

BRIEF DESCRIPTION OF THE DRAWINGS

For a better understanding of the present invention, a preferred embodiment, which is intended purely by way of example and is not to be construed as limiting, will now be described with reference to the attached drawings, wherein.

DETAILED DESCRIPTION OF PREFERRED EMBODIMENTS OF THE INVENTION

The following description is presented to enable a person skilled in the art to make and use the invention. Various modifications to the embodiments will be readily apparent to those skilled in the art, and the generic principles herein described may be applied to other embodiments and applications without departing from the scope of the present invention. Thus, the present invention is not intended to be limited to the embodiments shown, but is to be accorded the widest scope consistent with the principles and features disclosed herein and defined in the attached claims.

Implementation of a flow management mechanism of the type described above requires performing the following functions:

classification of incoming traffic, carried out by a classifier, aimed at distinguishing the various application data flows, hereinafter referred to as individual flows, to which the mechanism is applied. This classification is carried out on the basis of an n-uple, for example a quintuple including source IP address, destination IP address, level-4 protocol, source application port, and destination application port), or alternative/additional data that can be obtained from the incoming traffic, that unequivocally identifies each individual flow;

scheduling, carried out by a scheduler, aimed at determining which data packet to serve (transmit or forward) from the various data packets of the individual flows that are waiting to be transmitted at any given instant; and shaping, carried out by a shaper able to operate with the scheduler, aimed at guaranteeing that the total amount of bandwidth utilized for transmitting the data packets does not exceed a predefined threshold. To limit the maximum speed with which the individual flows are served as a whole avoids congestion downstream of the point in which the mechanism operates. In the presence of a potential congestion point, it is therefore contemplated that the mechanism works in such a way to limit the number of individual flows admitted, so as not to exceed the bandwidth, which in any case is guaranteed for the service class to which the individual flows belong, at the point of congestion.

In synthesis, the flow serving mechanism according to the present invention may be implemented via a flow management system including at least three functional elements:

a classifier that, starting from the received aggregate application data flows, hereinafter referred to as aggregate flows, identifies each individual flow and separates it from the others so as to serve each individual flow in an individual manner;

a scheduler that serves the individual flows in a manner that guarantees a desired behaviour; and a shaper that guarantees that the total amount of bandwidth utilized for transmitting the data packets of the individual flows does not exceed a predefined threshold.

In this system, the flow serving logic can reside either in the scheduler or in the classifier. In other terms, the scheduler could define the set of individual flows that can be well served on the basis of the available resources (well-served flows), distinguishing them from the remaining ones for which resources are insufficient (bad-served flows), or the task could be assigned to the classifier that, concomitantly with identifying the individual flow, determines the service to which it will be subjected (good/bad service). The first case, may be defined as an implicit well-served flow definition, as it is automatic for the scheduler to decide which individual flows are well served on the basis of the resources placed at its disposition by the shaper and those that are not, while the second case may be defined as an explicit well-served flow definition, as the classifier should actively and explicitly decide which individual flows are to be well served and those that are not, on the basis of the bandwidth used by the individual flows, the bandwidth currently used by the set of well-served flows and the total available bandwidth. The well-served flow definition mechanism, whether implicit or explicit, should be continuous in time. In other words, at any instant in which an event occurs that might alter the current definition of the set of well-served flows (presence of a new individual flow, termination of an existing well-served flow, or changes in bandwidth of well-served flows), the well-served flow definition mechanism should operate to determine the new set of well-served flows, removing one or more individual flows from the well-served set or promoting previously bad-served flows to well served.

Figure 1:
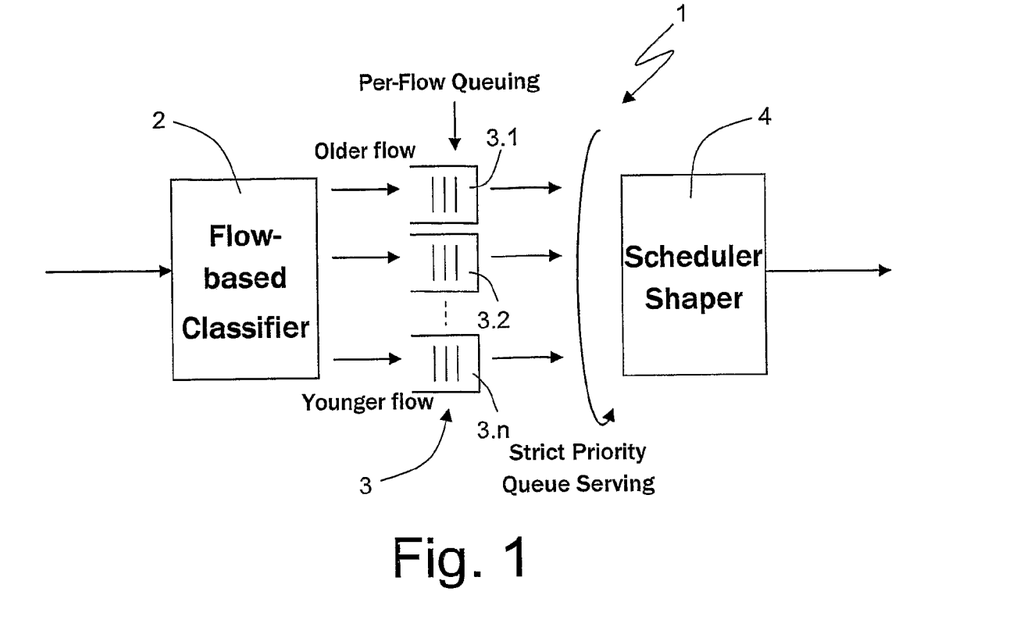
FIG. 1 shows a conceptual block diagram of a first embodiment of the present invention.

FIG. 1 shows a block diagram of a flow management apparatus, referenced by 1, according to a first embodiment of the present invention, wherein the classifier is referenced by 2, the per-flow queuing produced by the classifier 2 is referenced as a whole by 3, the individual queues, one for each served individual flow, are referenced by 3.1 to 3.n, and the scheduler/shaper is referenced by 4.

The classifier 2 receives an aggregate flow which is homogeneous in terms of service class, i.e. an aggregate flow which is made up of individual flows belonging to the same service class (voice, video, data, best effort), and classifies each individual flow based on the n-uple distinguishing the related data packets, which are added to a queue associated with the respective individual flow according to this classification. When a new individual flow is received, namely when a first data packet of a previously non-served individual flow is received, a new queue is formed and added to the set of those already served. Vice versa, when a previously served flow is not received any longer, namely when no more data packets are received for that individual flow in a certain, fixed time interval, the associated queue is removed from the served queues.

Periodically, according to the serving resources (transmission bandwidth) allocated to it by the shaper, the scheduler 4 serves the queues based on a strict priority criterion, namely, given a predefined queue serving order, the scheduler serves the queues according to this queue serving order, i.e., first of all serves (forwards) all packets waiting on the first queue according to the serving order, then all those on the second one, followed by those on the third one and so on until, for that specific service cycle, the scheduler has utilized all of the due serving resources or there are no data packets on any queue waiting to be forwarded. In conditions of insufficient serving resources, this queue serving policy favors the queues served first at the expense of those served afterwards.

An age-based queue serving ordering may be one of the possible criteria for defining the queue serving order, according to which the queues are served from the oldest to the youngest, namely from the first in time established one to the most recently established one. In doing this, a service logic is implemented that, in case of insufficient resource, guarantees the oldest individual flows (those first established) at the expense of the younger ones (most recently established). An admission control mechanism is thus created that, based upon the available serving resources, admits new individual flows as long as the available serving resources so allow, and transfer any disservice tied to service resource unavailability just on the newly established flows exceeding the quota of available serving resources.

Figure 2:
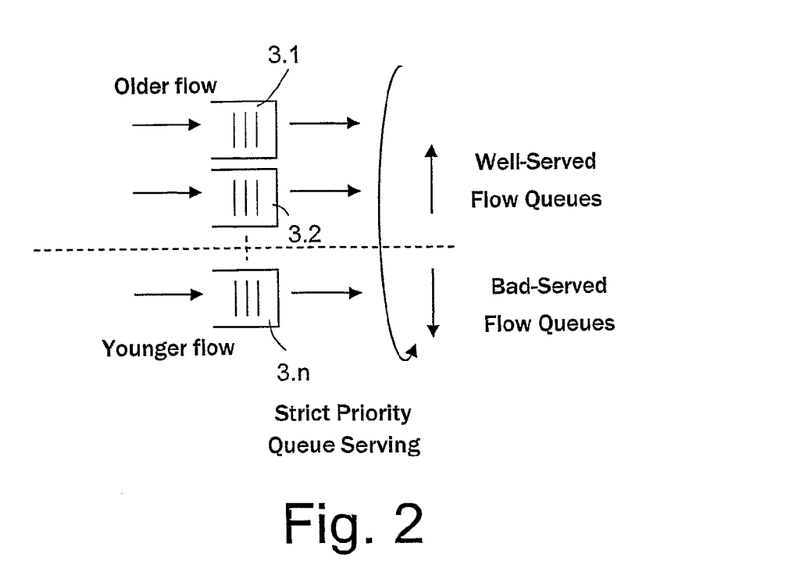
FIG. 2 shows discrimination between well-served queue and bad-served queues in the first embodiment of the present invention.

It may be noted that the well-served flow definition mechanism is automatically implemented by the scheduler (implicit well-served flow definition mechanism), which only serves the queues as long as permitted by the serving resources. The threshold that divides the well-served flows from the bad-served flows (in the case of transmission resource insufficiency) is thus automatically set by the scheduler and is schematically shown in FIG. 2 by a dotted line.

It may be further noted that, when a well-served flow "ends", a younger, not previously well-served flow is automatically upgraded to the group of well-served flows (if enough resources was released by the expired flow) and thus gains access to the resources it needs (implicit upgrade mechanism).

It can also be noted that, if one or more currently well-served flows increase its/their transmission bandwidth utilization, one or more of the previously well-served flows become bad-served ones. In the case of constant bit rate (CBR) individual flows, this possibility should not actually occur, with the practical result that if an individual flow becomes one of the well-served flows, it should not leave the group, as its age can only grow. This would be a desirable result, as it would thus be possible to guarantee the user an adequate level of quality for the individual flow from the beginning of its consumption to the end.

Regarding this implementation, it may be appreciated that:
the latency distribution between the well-served flow queues, because these are served with a strict priority policy, shows a growing trend in relation to the queue serving order, but maintains a good Quality of Experience if applied to non-interactive services; and
the necessity of maintaining a queue for each individual flow is preferably applied in cases where the transmission bandwidth required by each individual flow is not too narrow in relation to the total transmission bandwidth of the service class that the total number of individual flows becomes so high to be operatively unmanageable by the system.

Figure 3:
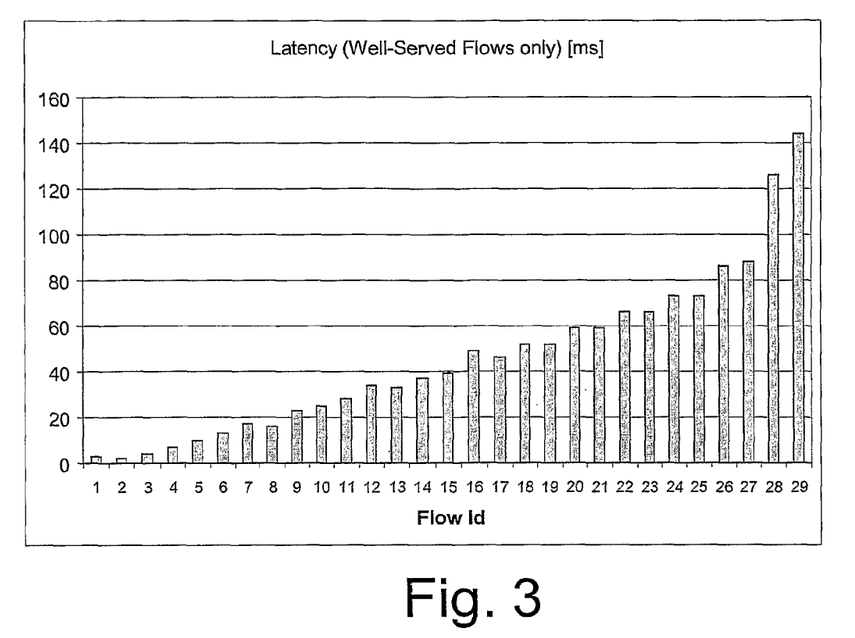
FIG. 3 shows a chart of an experimental distribution of latencies associated with a set of well-served flows.
Figure 4:
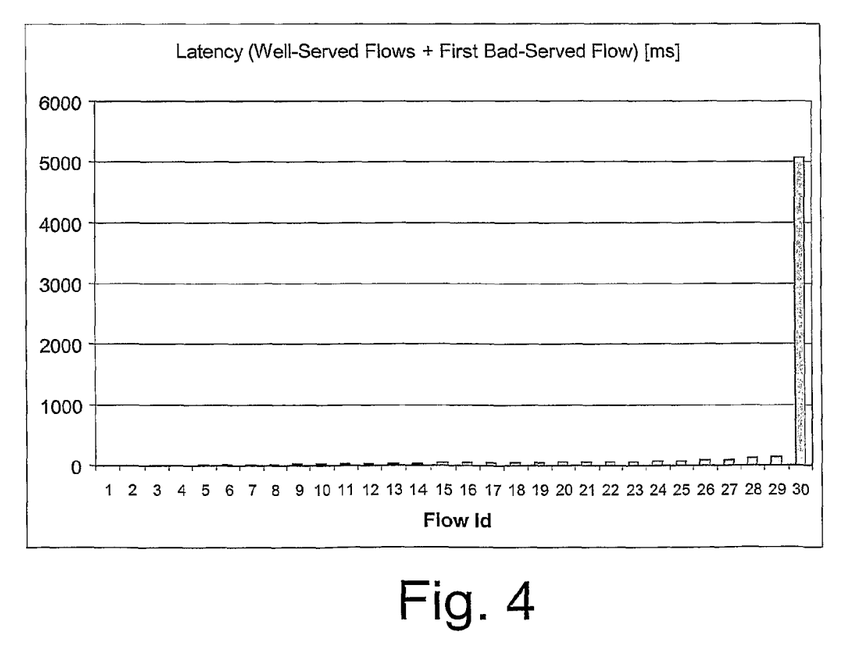
FIG. 4 shows a chart of an experimental distribution of latencies associated with the set of well-served flows with respect to the first bad-served one.

By way of example, FIG. 3 shows a chart of latency distributions, obtained from experimental tests, associated with a set of well-served flows, while FIG. 4 shows a chart of latency distributions, obtained from experimental tests, associated with a set of well-served flows and with respect to the first bad-served flow. In particular, the selectivity of the algorithm's response with regard to the discrimination between well-served and bad-served flows can be noted in FIG. 4. A similar selectivity can also be seen in bandwidth distribution: all of the well-served flows use the bandwidth they need without undergoing losses, while apart from the first bad-served flow, none of the following ones receive any bandwidth (starvation). The efficiency of the mechanism allows all of the available bandwidth to be occupied on the basis of the requests reaching the system, allowing at most just one not completely served flow.

A slightly more complex queue serving ordering than strict priority may be the following. Assuming to serve the individual flows with strict priority, the scheduler determines at each service cycle, on the basis of the serving resources it is allocated by the shaper for that service cycle, the last queue that can be well served. Once the group of well-served flows has been so defined for the specific service cycle, the scheduler serves the queues in this group in a fair manner, namely by dequeuing a single data packet from each one of them in turn, until there are no more queued data packets or until the serving resources allocated by the shaper for the service cycle is exhausted. In doing this, the latency, which in the previously described embodiment (strict priority) was concentrated on the last well-served flows, is now distributed more uniformly between all of the well-served flows, thereby achieving latency values that render the mechanism also applicable to inelastic individual flows having real-time and interactivity characteristics.

The above-described flow management mechanisms are designed to operate on a homogeneous individual flow, for example a video flow, an audio flow, etc. In the case in which the network node is traversed by an heterogeneous aggregate flow, for example data, video, voice, best-effort, etc., it is always possible to apply the present invention to one or more service classes by exploiting an architecture similar to that shown in FIG. 1.

Figure 5:
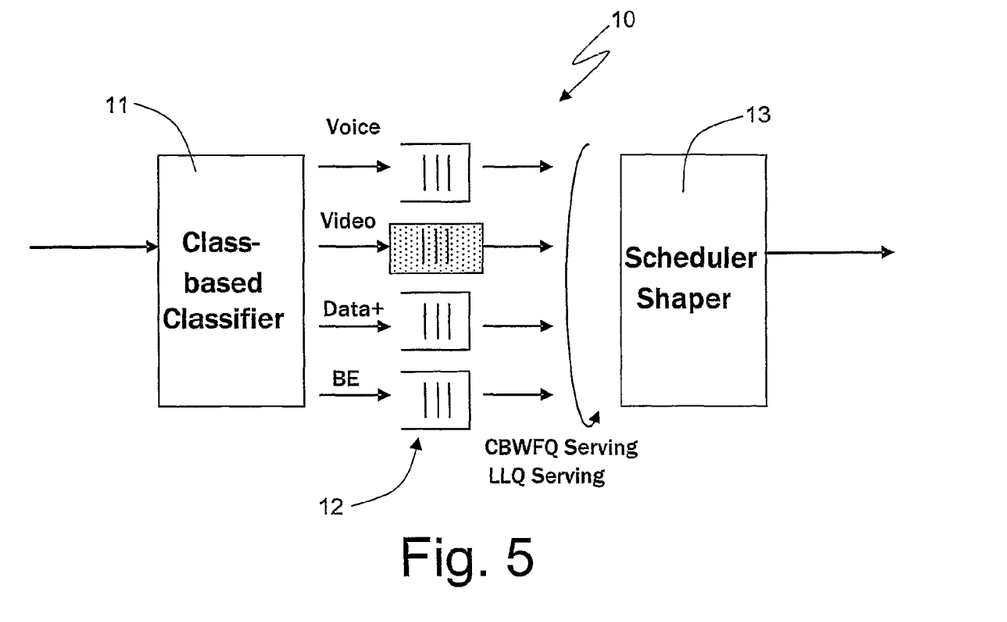
FIG. 5 shows a conceptual block diagram of application of a network section mechanism with different flow types.

In particular, FIG. 5 shows a block diagram of a communication network node, referenced by 10, traversed by an heterogeneous aggregate flow and where the flow management mechanism according to the present invention is applied to the service class of the video flows only (indicated with a dotted background block), even if in the first instance it could have also been applied to other classes of flow with inelasticity characteristics (for example, the voice flows). As shown in FIG. 5, a classifier 11 receives the heterogeneous aggregate flow i.e. an aggregate flow which is made up of flows belonging to different service classes (voice, video, data, best effort), and, based on the Type of Service (ToS) or Differentiated Services Code Point (DSCP) packet tagging for example, discriminates between the various classes of individual flows, which are then fed to respective queues 12 associated with the respective service classes. An output scheduler/shaper 13 periodically serves the queues according to the resources allocated to it by the shaper. In particular, the queues are served by the scheduler according to either a Class-Based Weighted Fair Queuing (CBWFQ) serving criterion configured with specific weights for each service class or a Low Latency Queuing (LLQ) Serving criterion, together with the mechanism of the present invention. If the bandwidth assured to the video class by the CBWFQ scheduler is higher than or equal to the maximum bandwidth controlled by the flow management mechanism according to the present invention, the mechanism of the present invention guarantees that no congestion occurs for the well-served video flows.

Figure 6:
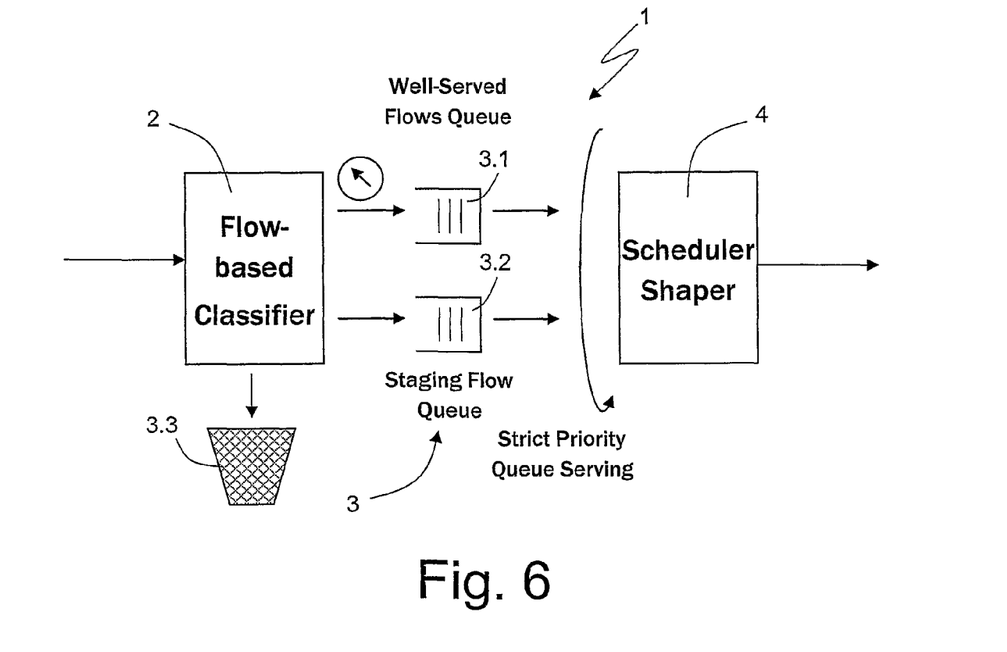
FIG. 6 shows a conceptual block diagram of a different embodiment of the present invention.

FIG. 6 shows a block diagram of a flow management system according to a second embodiment of the present invention. The flow management system has an architecture similar to that of the flow management system 1 of FIG. 1 and hence same reference numerals designate same elements, which will not be described again.

In broad outline, this embodiment contemplates moving the well-served flow definition from the scheduler to the classifier, with the advantage of requiring a limited number of queues, irrespective of the number of individual flows served.

Architecturally, the solution provides a classifier 2 that maintains a list containing the service state for each individual flow, on the basis of which it decides what to do with the data packets of the individual flow, in particular whether to store them on a well-served flow queue, to store them on a staging flow queue, or to drop them. In this case, the per-flow queuing 3 includes two individual queues only, referenced by 3.1 and 3.2, while the data packet dropping is referenced by 3.3.

The scheduler 4 limits itself to serving these queues with extremely simple strict priority logic: as long as there are data packets on the well-served flow queue, it serves (transmits/forwards) them; if there are no data packets on the well-served flow queue, the scheduler transmits any data packets in the staging flow queue.

The complexity of the well-served flows definition has thus been moved to the classifier 2, which should maintain per-flow information and associate one of the three following states to each flow: well-served, staging, or dropping. The association between a flow state and the service of the corresponding data packets by the classifier is: if the flow state is well-served, its data packets will be placed on the well-served flow queue, if instead the flow state is staging, its data packets will be placed on the staging flow queue, while finally, if the flow state is dropping, its data packets will be dropped (discarded and not transmitted).

The algorithm that manages flow state assignment to each flow is described below:

when a new individual flow is received, it is set to the staging state, unless there is already another individual flow in that state, in which case the new individual flow is directly set to the dropping state;

when an individual flow is in the staging flow queue, a processing is carried out to evaluate whether its bandwidth occupation is compatible, together with the bandwidth already occupied by the well-served flows, with the available resources provided by the shaper. This evaluation is made by analyzing whether an individual flow experiences data packet losses (drops associated with the staging flow queue) or not during its staying in the staging flow queue. It may be appreciated that as the staging flow queue is served at a lower priority than that of a well-served flow queue, any bandwidth excess caused by an individual flow in the staging flow queue does not cause quality degradation for the well-served flows;

if no data packet losses occur when an individual flow is in the staging flow queue, the individual flow is considered upgradeable to the well-served flow queue and its state therefore passes from staging to well-served (explicit upgrade). Otherwise, it remains in the staging state;

when an individual flow is upgraded from the staging state to the well-served state, the oldest individual flow in the dropping state is upgraded to the staging state (in turn running for upgrade to the well-served state);

the classifier 2 performs bandwidth monitoring on the traffic it has admitted on the well-served flow queue, in order to check that the mean bandwidth utilized by the well-served flows does not exceed the maximum bandwidth allowed by the shaper. If this happens, the youngest well-served flow is downgraded to the staging phase, it turn ousting any flow in the staging flow queue, which would pass to the dropping state.

As all the well-served flows are served in a homogeneous manner (same queue), the latency is equally divided over all of the flows, as desired. Additionally, it can be noted that, with respect to the previously described embodiments, in this embodiment the well-served flow definition mechanism is now explicitly managed by the classifier (explicit well-served flow definition) through the above-described state passages.

It can also be noted that, in this embodiment, classifier and shaper can be located in two separated devices. In this case the classifier acts for indirectly enqueuing a packet in queue 3.1 or 3.2 on the second device by tagging opportunely that packet, or alternatively for dropping it (3.3) on the device where classifier is located, according to the previous algorithm. On the second device, the shaper implements the flows management enqueuing the packets according the previously set tags, and serving them according to a specific queue policy available on it (e.g. strict priority).

The advantages of the present invention are evident from the foregoing description. In particular, the present invention allows the previously described problems associated with the inelastic flows to be completely overcome with an architecturally and implementationally simple solution, which does not require, except for the last embodiment, any real-time measurement of used bandwidth.

Finally, it is clear that numerous modifications and variants can be made to the present invention, all falling within the scope of the invention, as defined in the appended claims.

In particular, it may be appreciated that the present invention may be also applied to any type of flow other than inelastic one in particular if its behavior is similar to that of a Constant Bit Rate (CBR) flow, and in particular also to CBR TCP-based elastic flows.

The invention claimed is:

1. A method for serving an aggregate flow in a communication network node having allocated serving resources, the aggregate flow comprising a plurality of individual flows having associated serving resource needs and serving priorities, comprising:

identifying in the aggregate flow, based on the serving resources allocated to the network node, a set of individual flows that may be served according to the serving resource needs of individual flows within the set and placing the set of individual flows in a serving queue;

identifying in the aggregate flow a second individual flow from the remaining individual flows other than the identified set and placing the second individual flow in a staging queue;

automatically updating the composition of the set of individual flows, based on changes to the aggregate flow;

serving the updated set of individual flows based on the associated serving priorities and on a serving priority criterion, by sharing the serving resources allocated to the network node such that individual flows are served by meeting the serving resource needs of individual flows within the updated set;

serving the second individual flow in the staging queue using remaining serving resources allocated to the network node;

determining whether data loss occurs in the staging queue; and when it is determined that no data loss occurs, upgrading the second individual flow from the staging queue to the serving queue.

2. The method of claim 1, wherein the serving priority is assigned based on an age-based flow serving criterion.

3. The method of claim 1, wherein the serving priority is assigned based on a fair serving criterion.

4. The method of claim 1, wherein the updated set of individual flows belong to a same service class.

5. The method of claim 1, wherein the updated set of individual flows are inelastic flows.

6. The method of claim 1, wherein the updated set of individual flows are constant bit rate elastic flows.

7. The method of claim 1, wherein the communication network is a packet-based network and the individual flows are data packet flows.

8. The method of claim 7, wherein serving the updated set of individual flows comprises:

per-flow queuing data packets of the individual flows; and serving the queued data packets of the updated set of individual flows before the queued data packets of remaining individual flows in the aggregate flow.

9. The method of claim 7, wherein serving the updated set of individual flows comprises:

queuing the data packets of the updated set of individual flows to form a first queue; and serving the data packets in the first queue.

10. The method of claim 9, wherein serving the updated set of individual flows further comprises:

queuing the data packets of a further individual flow in the aggregate flow to form a second queue;

evaluating whether available serving resources of the network node allow the further individual flow to be prospectively served; and if so, switching the data packets of the further individual flow from the second queue to the first queue.

11. The method of claim 10, wherein queuing the data packets of a further individual flow in the aggregate flow to form a second queue comprises:

checking whether the second queue already contains data packets of another individual flow;

storing the data packets of the further individual flow in the second queue if the second queue does not contain any data packets of another individual flow; and dropping the data packets of the further individual flow if the second queue already contains data packets of another individual flow.

12. The method of claim 11, wherein serving the updated set of individual flows further comprises:

if the available serving resources of the network node allow the data packets of an individual flow in the second queue to be switched to the first queue, stopping dropping the data packets of the further individual flow and storing next data packets of the further individual flow in the second queue.

13. The method of claim 9, further comprising:

monitoring exploitation of the serving resources of the network node; and if current exploitation of the serving resources of the network node exceeds the serving resources allocated to the network node, dropping the data packets of the individual flow in the second queue and switching the packets of an individual flow in the first queue to the second queue.

14. The method of claim 1, further comprising:

notifying the presence of individual flows that may not be served according to the serving resource needs thereof, due to shortage of serving resources.

15. A system for serving an aggregate flow in a communication network node having allocated serving resources, the aggregate flow including a plurality of individual flows having associated service resource needs and priorities, the system comprising:

a shaper configured to allocate serving resources to the network node;

a classifier configured to:

identify in the aggregate flow, based on the serving resources allocated to the network node, a set of individual flows that may be served according to the serving resource needs thereof and place the set of individual flows in a serving queue;

identify in the aggregate flow a second individual flow from the remaining individual flows other than the identified set and place the second individual flow in a staging queue; and automatically update the composition of the set of individual flows, based on changes to the aggregate flow; and a scheduler configured to:

serve the updated set of individual flows based on the associated serving priorities and on a serving priority criterion, by sharing the serving resources allocated to the network node such that individual flows are served by meeting the serving resource needs of individual flows within the updated set;

serve the second individual flow in the staging queue using remaining serving resources allocated to the network node;

determine whether data loss occurs in the staging queue; and when it is determined that no data loss occurs, upgrade the second individual flow from the staging queue to the serving queue.

* * * * *